(12) United States Patent
Büttner et al.

(10) Patent No.: US 8,836,193 B2
(45) Date of Patent: Sep. 16, 2014

(54) SQUIRREL-CAGE ROTOR

(75) Inventors: Klaus Büttner, Hollstadt (DE); Jens Kurth, Unsleben (DE); Michael Müller, Bad Kissingen (DE); Norbert Wöhner, Heustreu (DE)

(73) Assignee: Siemens Aktiengesellschaft, München (DE)

( * ) Notice: Subject to any disclaimer, the term of this patent is extended or adjusted under 35 U.S.C. 154(b) by 89 days.

(21) Appl. No.: 13/148,805

(22) PCT Filed: Feb. 5, 2010

(86) PCT No.: PCT/EP2010/051441
§ 371 (c)(1),
(2), (4) Date: Aug. 10, 2011

(87) PCT Pub. No.: WO2010/100007
PCT Pub. Date: Sep. 10, 2010

(65) Prior Publication Data
US 2011/0316380 A1 Dec. 29, 2011

(30) Foreign Application Priority Data
Feb. 11, 2009 (DE) .......................... 10 2009 008 440

(51) Int. Cl.
*H02K 17/16* (2006.01)
*H02K 17/18* (2006.01)
*H02K 17/20* (2006.01)
(52) U.S. Cl.
CPC ............ *H02K 17/165* (2013.01); *H02K 17/205* (2013.01)

USPC .......................... 310/125; 310/211; 310/212
(58) Field of Classification Search
CPC ...... H02K 17/165; H02K 17/16; H02K 17/18
USPC ........ 310/125, 156.78, 156.81, 166, 211, 212
See application file for complete search history.

(56) References Cited

U.S. PATENT DOCUMENTS

| 3,775,260 | A | 11/1973 | Capuano et al. | |
| 2007/0290569 | A1* | 12/2007 | Bode et al. | 310/261 |
| 2011/0316380 | A1* | 12/2011 | Buttner et al. | 310/211 |
| 2012/0169158 | A1* | 7/2012 | Buttner et al. | 310/54 |

FOREIGN PATENT DOCUMENTS

| CN | 1452301 A | 10/2003 |
| CN | 1756050 A | 4/2006 |
| CN | 1780116 A | 5/2008 |

(Continued)

*Primary Examiner* — Terrance Kenerly
(74) *Attorney, Agent, or Firm* — Henry M. Feiereisen LL

(57) ABSTRACT

The invention relates to a squirrel-cage rotor for an asynchronous machine. In order to increase the electrical efficiency for a cage rotor composed of two materials, the cage rotor comprises a rotor core (1) having grooves (3), end rings (5) of a first material that are cast onto the rotor core on the end face, and conductors (4) that are arranged in the grooves and that are made of a second material that has an electric conductivity that is higher than the electric conductivity of the first material, wherein the conductors (4) comprise a coating (8) made of a coating material on the surface of the conductors, wherein the coating adjoins the second material of the conductors (4) by means of a first alloy layer (2) made of the second material and the coating material and adjoins the cast first material by means of a second alloy layer (9); made of the first material and the coating material.

22 Claims, 2 Drawing Sheets

(56) References Cited

FOREIGN PATENT DOCUMENTS

| | | |
|---|---|---|
| DE | 1013358 B | 8/1957 |
| DE | 43 08 683 A1 | 9/1994 |
| FR | 516 373 A | 4/1921 |
| JP | 56103953 A | 8/1981 |
| JP | 4088855 A | 3/1992 |
| JP | 9074726 A | 3/1997 |
| JP | 10028360 A | 1/1998 |
| JP | 10234166 A | 9/1998 |
| WO | WO 2008034712 A1 | 3/2008 |

* cited by examiner

SQUIRREL-CAGE ROTOR

CROSS-REFERENCES TO RELATED APPLICATIONS

This application is the U.S. National Stage of International Application No. PCT/EP2010/051441, filed Feb. 5, 2010, which designated the United States and has been published as International Publication No. WO 2010/100007 A1 and which claims the priority of German Patent Application, Serial No. 10 2009 008 440.1, filed Feb. 11, 2009, pursuant to 35 U.S.C. 119(a)-(d).

BACKGROUND OF THE INVENTION

The invention relates to a squirrel-cage rotor for an asynchronous machine. Furthermore, the invention relates to a process for producing a squirrel-cage rotor.

Such a squirrel-cage rotor is known from DE 43 08 683 A1. This rotor comprises a laminated core with slots, into which short-circuited bars made of copper are initially pushed in. At the end faces, the copper bars are bonded to one another by short-circuiting rings. These short-circuiting rings are produced from aluminum by a die-casting process. As the short-circuiting rings are being cast, at the same time the residual cross section which remains in the slots around the inserted copper bars is filled with aluminum, such that the short-circuiting rings are bonded to the die-cast bar parts formed in the residual cross section.

Since copper has a very much higher electrical conductivity than aluminum, it is thereby possible to achieve a decisive improvement in the efficiency of such an asynchronous machine compared with an asynchronous machine with a squirrel-cage rotor consisting entirely of die-cast aluminum material.

During operation, the asynchronous machine and therefore also the squirrel-cage rotor pass through thermal cycles which are dependent on the electrical losses within the machine. This leads to thermal expansion in the rotor which is inhomogeneous in such a squirrel-cage rotor on account of the differing coefficients of thermal expansion of aluminum and copper. As a result, the copper bars can break away from the die-cast aluminum material of the short-circuiting rings, as a result of which finally the electrical transition conductivity between the short-circuiting rings and the rotor bars is impaired.

It is possible to realize efficiencies similar to those for the above-described squirrel-cage rotors produced by means of aluminum die-casting processes using a die-cast copper rotor. Since this consists entirely of copper, the aforementioned problems relating to the differing coefficients of thermal expansion do not arise. However, the copper die-casting process is very complex and places stringent requirements on the die-casting mold, since copper has to be heated to temperatures of above 1000° C. for the die-casting process. In the case of aluminum, by contrast, it is possible to work at very much lower temperatures during die-casting. Furthermore, a squirrel-cage rotor which consists entirely of copper is heavier and therefore more inert in terms of its starting response than the squirrel-cage rotor known from DE 43 08 683 A1, which has short-circuiting rings made of aluminum.

The invention is based on the object of increasing the electrical efficiency for a squirrel-cage rotor which consists of two materials and is produced by means of die-casting processes.

SUMMARY OF THE INVENTION

This object is achieved by a squirrel-cage rotor for an asynchronous machine, wherein the squirrel-cage rotor comprises
  a laminated rotor core with slots,
  short-circuiting rings which are cast onto the end face of the laminated rotor core and are made of a first material, and
  conductors which are arranged in the slots and are made of a second material having an electrical conductivity which is higher than that of the first material,
wherein the surface of the conductors is provided with a coating which is made of a coating material, adjoins the second material of the conductors via a first alloy layer made of the second material and the coating material, and adjoins the cast, first material via a second alloy layer made of the first material and the coating material.

Furthermore, the object is achieved by a process for producing a squirrel-cage rotor for an asynchronous machine, comprising the following process steps:
  conductors made of a second material are inserted into slots of a laminated rotor core, and
  short-circuiting rings made of a first material having an electrical conductivity which is lower than that of the second material are cast onto the end face of the laminated rotor core,
wherein the surface of the conductors is provided with a coating made of a coating material in such a manner that a first alloy layer made of the second material and the coating material is produced between the second material of the conductors and the coating, wherein the coating material is constituted in such a manner that, during the casting process, a second alloy layer made of the first material and the coating material is produced between the coating and the cast, first material.

The invention is based on the understanding that the bond between the conductors and the short-circuiting rings can be improved greatly by the first and second materials entering into a solid-solution bond at suitable sites. The short-circuited bars protrude out of the laminated rotor core at both end-face ends thereof and into the cast short-circuiting rings. According to the invention, the bonding forces between the conductor ends and the short-circuiting rings are increased by coating the conductors in such a manner that an alloy—i.e. a solid-solution bond—is produced both between the coating and the conductors and between the coating and the cast, first material of the short-circuiting rings.

Advantageous configurations of the invention are specified in the dependent claims.

Thus, a particularly advantageous configuration of the invention provides for the slots equipped with the conductors to be filled with the first material by a die-casting process, wherein the short-circuiting rings are produced by means of the die-casting process. As a result of this, the short-circuited bars are fixed outstandingly in the slots. If the short-circuited bars are arranged at the radially inwardly directed slot base, starting bars are produced as a result of the melt hardening in the slots and, on account of their low electrical conductivity compared to the short-circuited bars, improve the starting response of the asynchronous machine.

If the squirrel-cage rotor is heated during operation, temperatures of about 150° C. are reached. This results in high thermal expansion in the slot regions filled by the first material, particularly when the first material is aluminum. This can result in the transition between the conductors and the short-circuiting rings breaking away, as a result of which the electrical conductivity in the region of the transition between the short-circuiting rings and the conductors is impaired. The laminated rotor core which is pressed together axially in the die-casting process for sealing reasons can expand axially again if the bond between the conductors and the cast short-circuiting rings cannot apply an adequate holding force.

As a result of the coating, the conductors are bound to the die casting by the greatest possible bonding forces. Accordingly, despite differing coefficients of thermal expansion of the first and second materials, the bond between the conductors and the short-circuiting rings remains stable even when the squirrel-cage rotor passes through pronounced thermal cycles during operation. At high rotational speeds, the centrifugal forces acting on the rotor also bring about partly severe stresses in the conductor/short-circuiting ring. Furthermore, an optimum electrical transition conductivity between the first and second materials is obtained by the alloy.

In a particularly advantageous configuration of the invention, the coating and the first alloy layer are produced by electrochemical deposition. In this context, a layer of the coating material is firstly deposited electrochemically on the conductors. In this process, the desired solid-solution bond is produced between the second material of the conductors and the coating material. If the first material is then applied in particular by means of the die-casting process, the coating fuses onto the conductors and likewise enters into a solid-solution bond with the pressure melt, such that the second alloy layer is produced.

Other coating processes which similarly lead to the desired solid-solution bonds between the first material and the coating and also between the second material and the coating are conceivable instead of electroplating. Thus, an advantageous embodiment of the invention provides for the coating and the first alloy layer to be produced by a thermal spraying process, in particular flame spraying, plasma spraying, arc spraying or laser spraying.

An alternative to this is defined by an embodiment of the invention in which the coating and the first alloy layer are produced by cold spraying processes.

A further alternative is formed by a configuration of the invention in which the coating and the first alloy layer are produced by vapor deposition.

In all of these processes, but in particular also in electroplating, a further advantageous configuration of the invention provides that, before coating, an oxide layer is removed from the conductors by chemical pretreatment of the conductors. An oxide layer has insulating electrical properties, and therefore the transition resistance between the first and the second material is reduced considerably by removing said oxide layer.

In a particularly advantageous configuration of the invention, the first material is aluminum and the second material is copper. This provides a hybrid squirrel-cage rotor which, since the conductors are made of copper, has an outstanding electrical efficiency, is very much easier to produce than a die-cast copper rotor and, compared to the latter, also has a lower mass and therefore a lower inertia, since the short-circuiting rings thereof are produced from the relatively light aluminum. Overall, it can be ascertained that such a hybrid rotor has a better efficiency than a die-cast copper rotor produced entirely from copper. In order to produce such a squirrel-cage rotor, the copper conductors are firstly pushed into the slots of the laminated rotor core. Then, an aluminum die-casting process is advantageously used to fill that region of the slots which is not occupied by the copper conductors. At the same time, the short-circuiting rings made of aluminum are advantageously produced by means of the die-casting process.

A further advantageous embodiment of the invention is characterized in that the coating material is the first material. By way of example, here a thin aluminum layer is applied to the surface of the copper conductors in the case of a hybrid rotor with copper bars and aluminum short-circuiting rings. This can take place for example by electroplating. In this coating process, an alloy is produced between the aluminum coating and the copper conductors. Then, the die-cast aluminum mass is injected into the slots, in which case the short-circuiting rings are simultaneously filled. Here, the aluminum coating is fused on the surface of the conductors and enters into a solid-solution bond with the aluminum melt. The second alloy layer is finally formed in the process. An extremely stable bond is produced between the two materials particularly in the region of the ends of the copper bars which protrude out of the laminated rotor core and into the short-circuiting rings, and therefore the strength with regard to thermal cycles and centrifugal forces occurring during operation is increased. This provides a virtually ideal electrical and mechanical bond between the short-circuiting rings made of aluminum and the copper bars.

During the casting process, significant chemical reactions can occur between the coated conductors and the melt. In order to avoid excessive material removal from the conductors by the melt of the first material which is in contact with the conductors, in an advantageous configuration of the invention the coating and the alloy layers can be arranged exclusively on end regions of the conductors which protrude out of the laminated rotor core and into the short-circuiting rings. Said end regions represent the critical bond site between the conductors and the short-circuiting rings. Accordingly, the strong crystalline bond is particularly important here. Primarily in this end region of each conductor, particular importance is also to be attributed to the electrical transition conductivity between the two materials, since here the flow of current passes over from the conductors to the short-circuiting rings. By contrast, a strong crystalline bond of the conductors in the regions within the slot is not so important even in the case of a rotor produced by means of die-casting, since here no flow of current is expected from the first material to the second material, or vice versa.

Particularly in the case of coating by electroplating, however, a simpler embodiment is provided by a configuration of the invention in which the coating and the alloy layers envelop the conductors completely.

A configuration of the invention in which one surface of the conductors, which faces toward the die-cast, first material within the slots, has no coating is also conceivable and advantageous, however. In this case, the removal of material on the surface of the conductors which faces toward the melt is prevented. Instead of there being no coating, it is also conceivable to provide a fusion-resistant coating on said surface. Thus, by way of example, the conductors could firstly be electroplated completely and thus coated with a coating material which brings about the desired alloy layers. Then, exclusively said surface of the conductors which faces toward the die-cast, first material within the slots could be provided with an appropriate fusion-resistant passivation layer.

In a further advantageous configuration of the invention, the bond between the conductors and the short-circuiting rings can be further strengthened in that each end of the conductors is provided with an end region which protrudes out of the laminated rotor core and into the short-circuiting rings and has interlocking means for producing an interlock between the conductors and the cast short-circuiting rings. These interlocking means in the end regions of the conductors further strengthen the bond between the conductors and the short-circuiting rings. The conductors which protrude at the ends are axially braced to the short-circuiting rings by the interlocking means. Depending on the temperature and depending on the coefficients of thermal expansion of the conductors and of the short-circuiting rings, the conductors are therefore tensioned or subjected to pressure. In this respect, the short-circuited rotor is to be designed such that the loading always remains in the elastic range. The interlocking means used prevent displacement of the conductors within the short-circuiting rings or prevent the conductors from being pulled out of the short-circuiting rings, as a result of which tearing of the joint between the two materials can be avoided. Through-holes in the end regions of the conductors, which are filled by the melt during the casting process, are conceivable, for example, as the interlocking means. Also conceivable as the interlocking means, instead of a through-hole, are recesses in the end regions, tapered areas of the conductors within the end regions, notches, knurled areas of the end regions, twisted areas of the conductors in the end regions or a cleavage of the conductors in the end regions.

On the basis of one of the above-described embodiments of the squirrel-cage rotor according to the invention, it is possible to realize in a very simple manner, with an appropriate stator, an asynchronous machine which always has a good electrical efficiency and proves to be extremely resilient even under thermal stresses and at high rotational speeds.

BRIEF DESCRIPTION OF THE DRAWING

In the text which follows, the invention is described in detail and explained with reference to the exemplary embodiments illustrated in the figures.

DETAILED DESCRIPTION OF PREFERRED EMBODIMENTS

Figure 1:
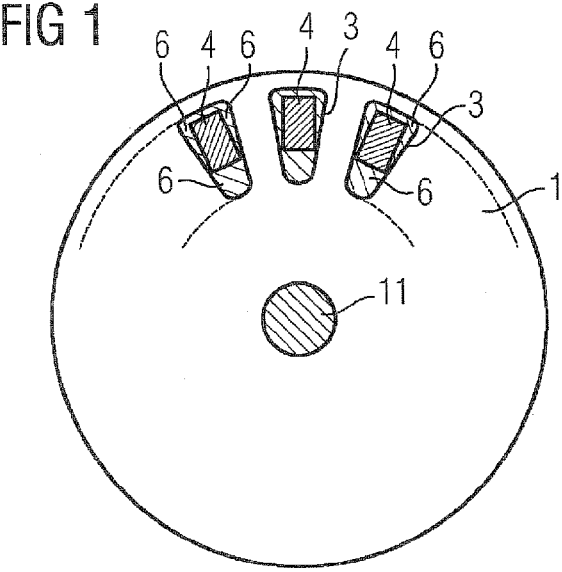
FIG. 1 shows an embodiment of a squirrel-cage rotor of an asynchronous machine in a hybrid construction.

FIG. 1 shows an embodiment of a squirrel-cage rotor of an asynchronous machine in a hybrid construction. This figure illustrates a laminated rotor core 1 of the asynchronous machine, which is shrunk onto a shaft 11. During the production of the squirrel-cage rotor, conductors 4, which are preferably made of copper, are firstly pushed into slots 3 of the laminated rotor core 1. As can be seen, the cross section of the conductors 4 is smaller than the cross-sectional area of the slots 3. Therefore, a residual cross section of the slot 3 remains free after the conductors 4 (in the form of copper bars) have been inserted.

In order to produce the short-circuited rotor, in the next step a die-casting process is employed. In this process, short-circuiting rings in contact at the end faces with the copper bars are produced, and at the same time the still free space of the slots 3 is filled with a melt. Aluminum bar parts 6, which fix the copper bars in their position and adjoin the latter directly, are then formed within the slots after the aluminum melt has hardened in the remaining residual cross section. These aluminum bar parts 6 can advantageously also be used as starting bars of the asynchronous machine, since they have a lower electrical conductivity than the copper conductors. Particularly when the aluminum bar parts 6 are arranged in the radially outwardly directed region of the slot, unlike in the illustration, they have a positive effect on the torque band of the asynchronous machine.

A squirrel-cage rotor with a particularly good electrical efficiency can be produced as a result of the hybrid construction, i.e. as a result of the use of conductors 4 made of copper and short-circuiting rings made of aluminum. This can firstly be attributed to the good conductivity of copper and secondly to the relatively low weight of the short-circuiting rings produced from aluminum, which results in an accordingly relatively small inert mass.

Figure 2:
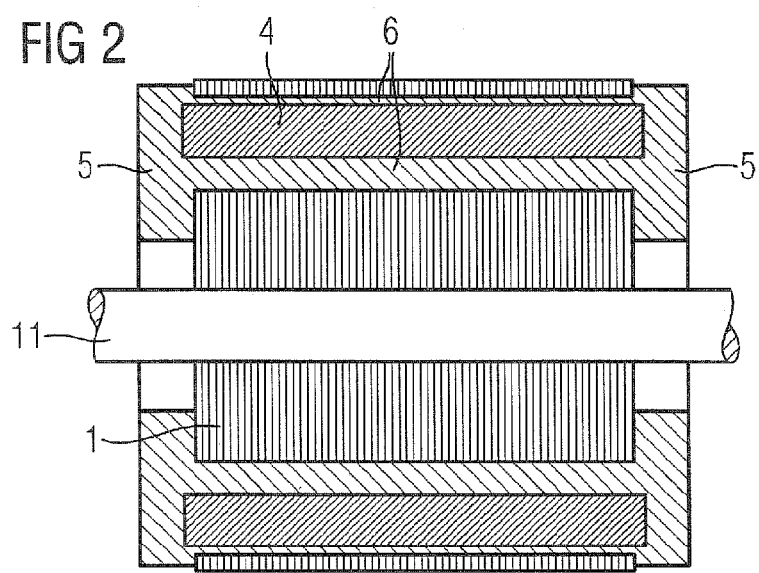
FIG. 2 shows a section through the squirrel-cage rotor.

FIG. 2 shows a section through the squirrel-cage rotor, in which, in addition to the laminated rotor core 1, it is possible to see the conductors 4 surrounded by the aluminum melt and inserted into the slots 3. At their end-face ends, these conductors 4 dip into the short-circuiting rings 5 produced from die-cast aluminum. Thermal cycles, which the squirrel-cage rotor passes through during operation of the machine, can result in the conductors 4 being detached from the short-circuiting rings 5, particularly in the end regions. This can be explained in particular by the differing coefficients of thermal expansion of the copper and aluminum materials used. Therefore, in the case of such a hybrid rotor, it is particularly important to ensure a stable bond between the two materials, copper and aluminum, in particular in the region of the short-circuiting rings 5.

Figure 3:
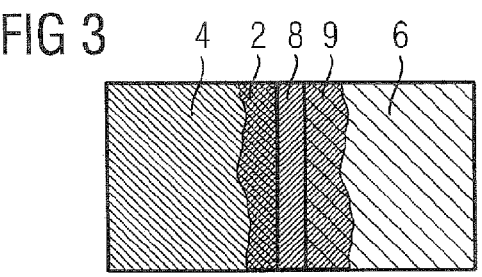
FIG. 3 shows a section through an interface between a coated conductor and the die-cast, first material.

FIG. 3 shows a section through an interface between a coated conductor 4 and the die-cast, first material of the aluminum bar parts 6. Such an interface is produced by the realization of the coating according to the invention of the conductors 4 before the die-casting process. Here, too, it should be assumed that the first material is aluminum and the second material, from which the conductors 4 are produced, is copper. The copper conductors are provided with a coating 8 by an electroplating process, for example. Beforehand, the conductors 4 are chemically treated in order to remove a copper oxide layer, which results in impairment of the electrical conductivity, from the surface thereof. Then, the conductors 4 are dipped into an electroplating bath, where a suitable coating material is applied. This can be the first material, i.e. aluminum, for example. This coating process produces a transition zone, which in the text which follows is referred to as the first alloy layer 2, between the coating 8 and the copper of the conductors 4. There is a solid-solution structure within the first alloy layer 2 which ensures that the coating 8 is bonded very firmly to the copper of the conductors 4.

In the further course of the process, the thus coated conductors 4, which are pushed into the slots 3 of the laminated rotor core 1, are exposed to the aluminum die-casting process. As soon as the melt approaches the conductors 4, the heat fuses part of the coating zone 8 on the surface. A second alloy layer 9 is formed, in which a solid-solution phase of the coating material and the die-cast aluminum is established. This finally ensures that the aluminum bar parts 6 adhere very firmly to the coating zone 8. This prevents the die-cast aluminum mass from becoming detached from the conductors 4 as the squirrel-cage rotor passes through thermal cycles or at extremely high rotational speeds.

Figure 4:
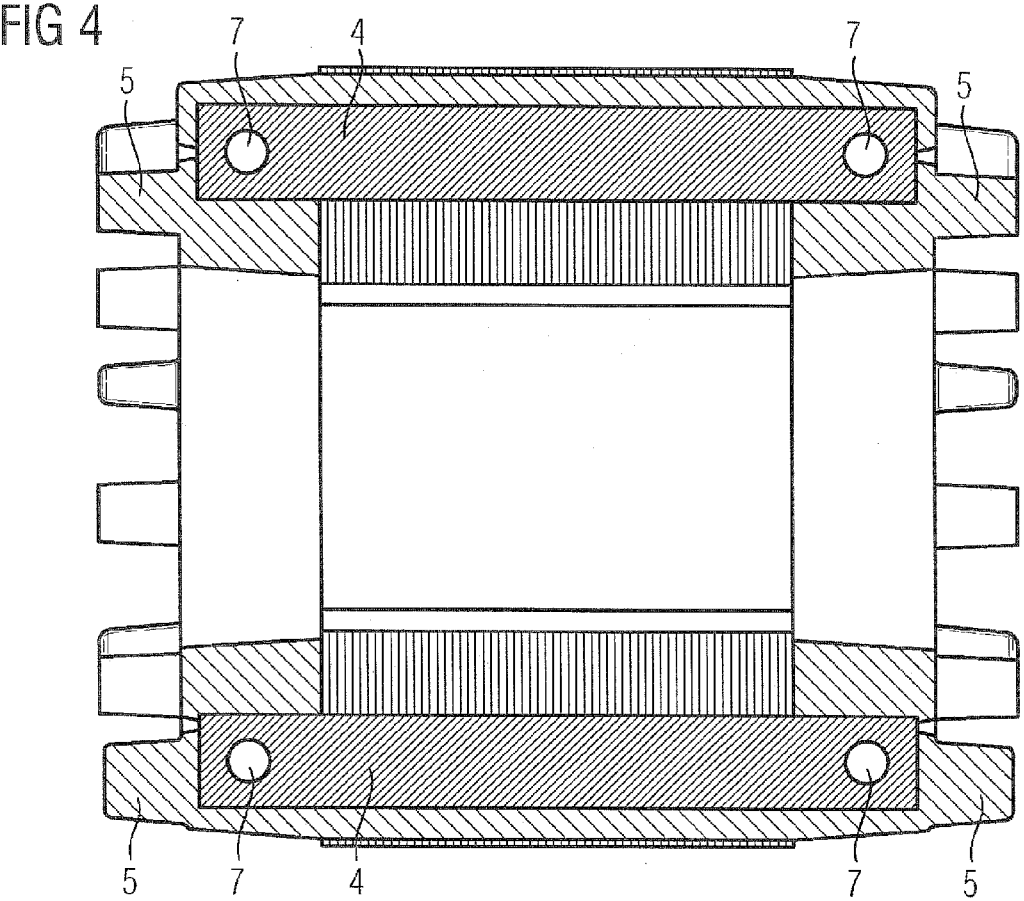
FIG. 4 is a sectional illustration showing a further embodiment of the squirrel-cage rotor in a hybrid construction with conductors having interlocking means in the region of the short-circuiting rings.

FIG. 4 is a sectional illustration showing a further embodiment of the squirrel-cage rotor in a hybrid construction with conductors 4 having interlocking means 7 in the region of the short-circuiting rings 5. The interlocking means 7 of the conductors 4 are in the form of through-holes. As soon as the laminated rotor core equipped with the conductors 4 is exposed to the aluminum die-casting process, the interlocking means 7 are infiltrated by aluminum melt. As a result of this, an interlocking bond additionally ensures that the conductors 4 remain bonded in the region of the short-circuiting rings 5 during the thermal cycles. The interlocking means 7 illustrated thus also promote the effect of the coating according to the invention to the effect that the end-face conductor ends are prevented from tearing out of the die-cast short-circuiting rings 5.

Figure 5:
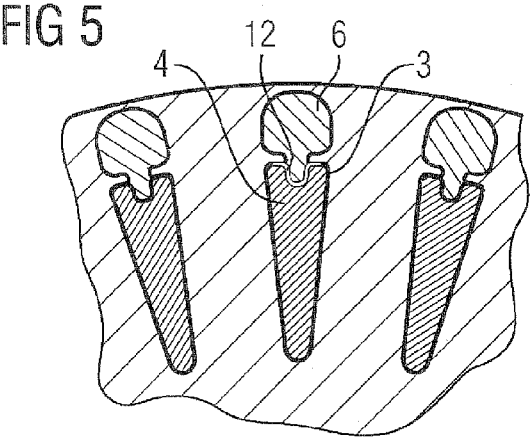
FIG. 5 shows a section through slots with conductors having a coating-free surface.

FIG. 5 shows a section through slots 3 with conductors 4 having a coating-free surface 12. The squirrel-cage rotor illustrated here is a hybrid rotor with aluminum bar parts 6, which perform the function of starting bars. Conductors 4 are firstly inserted into the slots 3 and rest directly on the radially inwardly directed slot base. During the aluminum die-casting process, the residual cross section which remains free is filled with aluminum melt, the residual cross section being located in the radially outwardly directed region. This firstly ensures that only one surface of the conductors 4 is in contact with the die-cast aluminum material. Secondly, the aluminum bar parts 6 lie radially on the outside, which, in the case of a squirrel-cage rotor formed with copper bars as the conductors 4, leads to a better starting response on account of the lower conductivity of aluminum. In addition, the outer-lying starting bars press the conductors 4 against the slot base in such a manner that the conductors 4 are fixed very firmly in the laminated rotor core.

Depending on the coating material, a not negligible removal of material from the conductor 4 may occur in the case of coated conductors 4 during the die-casting process. In order to prevent this, that side of the conductors 4 which faces toward the aluminum bar part 6 is formed without a coating. The conductors 4 are therefore not exposed to said material removal in the region inserted into the slots 3. Only the end regions of the conductors 4 which protrude out of the laminated rotor core are coated completely, in order to produce the desired strong bond with the short-circuiting rings here. By contrast, the solid-solution bond between the conductor 4 and the aluminum bar parts 6 is not required in the region of the slots.

Figure 6:
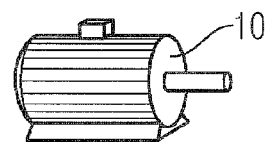
FIG. 6 shows an asynchronous machine with an embodiment of the squirrel-cage rotor.

FIG. 6 shows an asynchronous machine 10 with a squirrel-cage rotor according to one of the above-described embodiments. Such an asynchronous machine is distinguished by a high electrical efficiency and, compared to an asynchronous machine with a die-cast copper rotor, is very much easier and less expensive to produce. In addition, compared to an asynchronous machine with a die-cast copper rotor, the asynchronous machine 10 illustrated has an improved dynamic behavior, since the hybrid rotor of the asynchronous machine illustrated has a very much lower moment of inertia.

The invention claimed is:

1. A squirrel-cage rotor for an asynchronous machine, comprising:
   a laminated rotor core having slots;
   short-circuiting rings cast onto opposite end faces of the laminated rotor core and made of a first material having a specific electrical conductivity;
   conductors arranged in the slots and made of a second material having a specific electrical conductivity which is higher than the specific electrical conductivity of the first material, and
   a coating applied upon a surface of the conductors by electrochemical galvanizing and made of a coating material which is the first material, said coating adjoining the second material of the conductors via a first alloy layer made of the second material and the coating material, and adjoining the cast via a second alloy layer made of the first material and the coating material,
   wherein the first material is aluminum and the second material is copper, and
   wherein the coating and the first alloy layer are produced by electrochemical galvanizing providing an optimum electrical transition conductivity between the first and the seconds materials.

2. The squirrel-cage rotor of claim 1, wherein the coating is fused onto the conductors.

3. The squirrel-cage rotor of claim 1, wherein the slots are filled with the first material by a die-casting process, wherein the short-circuiting rings are produced by the die-casting process.

4. The squirrel-cage rotor of claim 3, wherein the conductors have a surface in facing relationship toward the die-cast, first material within the slots in the absence of a coating.

5. The squirrel-cage rotor of claim 1, wherein the coating and the first and second alloy layers are arranged exclusively on end regions of the conductors which protrude out of the laminated rotor core and into the short-circuiting rings.

6. The squirrel-cage rotor of claim 1, wherein the coating and the first and second alloy layers envelop the conductors completely.

7. The squirrel-cage rotor of claim 1, wherein each end of the conductors is provided with an end region which protrudes out of the laminated rotor core and into the short-circuiting rings, and further comprising interlocking means for producing an interlock between the conductors and the cast short-circuiting rings.

8. An asynchronous machine, comprising a stator having a stator winding and a squirrel-cage rotor which includes a laminated rotor core having slots, short-circuiting rings cast onto opposite end faces of the laminated rotor core and made of a first material having a specific electrical conductivity, conductors arranged in the slots and made of a second material having a specific electrical conductivity which is higher than the specific electrical conductivity of the first material, and a coating applied upon a surface of the conductors by electrochemical galvanizing and made of a coating material which is the first material, said coating adjoining the second material of the conductors via a first alloy layer made of the second material and the coating material, and adjoining the cast via a second alloy layer made of the first material and the coating material, wherein the first material is aluminum and the second material is copper, and wherein the coating and the first alloy layer are produced by electrochemical galvanizing providing an optimum electrical transition conductivity between the first and the seconds materials.

9. The asynchronous machine of claim 8, wherein the coating is fused onto the conductors.

10. The asynchronous machine of claim 8, wherein the slots are filled with the first material by a die-casting process, wherein the short-circuiting rings are produced by the die-casting process.

11. The asynchronous machine of claim 10, wherein the conductors have a surface in facing relationship toward the die-east, first material within the slots in the absence of a coating.

12. The asynchronous machine of claim 8, wherein the coating and the first and second alloy layers are arranged exclusively on end regions of the conductors which protrude out of the laminated rotor core and into the short-circuiting rings.

13. The asynchronous machine of claim 8, wherein the coating and the first and second alloy layers envelop the conductors completely.

14. The asynchronous machine of claim 8, wherein each end of the conductors is provided with an end region which protrudes out of the laminated rotor core and into the short-circuiting rings, and further comprising interlocking means for producing an interlock between the conductors and the cast short-circuiting rings.

15. A process for producing a squirrel-cage rotor for an asynchronous machine, comprising the steps of:
  inserting conductors of a second material having a specific electrical conductivity into slots of a laminated rotor core; and
  casting short-circuiting rings made of a first material having a specific electrical conductivity which is lower than the specific electrical conductivity of the second material onto an end face of the laminated rotor core;
  applying a coating made of a coating material which is the first material upon a surface of the conductors by electrochemical galvanizing in such a manner that a first alloy layer made of the second material and the coating material is produced between the second material of the conductors and the coating, wherein the coating material is constituted in such a manner that, during casting, a second alloy layer made of the first material and the coating material is produced between the coating and the cast,
  wherein aluminum is used for the first material and copper is used for the second material, and
  wherein the coating and the first alloy layer are produced by electrochemical galvanizing providing an optimum electrical transition conductivity between the first and the seconds materials.

16. The process of claim 15, wherein the coating fuses onto the conductors) during casting.

17. The process of claim 15, wherein the slots are filled with the first material by a die-casting process.

18. The process of claim 17, wherein the conductors have a surface in facing relationship toward the die-cast, first material within the slots in the absence of a coating.

19. The process of claim 15, wherein exclusively end regions of the conductors which protrude out of the laminated rotor core and into the short-circuiting rings are provided with the coating and the first alloy layer.

20. The process of claim 15, wherein the conductors are provided completely with the coating and the first alloy layer.

21. The process of claim 15, further comprising providing an interlock between the conductors and the cast short-circuiting rings at both end regions of the conductors which protrude out of the laminated rotor core and into the short-circuiting rings.

22. The process of claim 15, wherein, before coating, an oxide layer is removed from the conductors by chemical pretreatment of the conductors.

* * * * *

UNITED STATES PATENT AND TRADEMARK OFFICE
CERTIFICATE OF CORRECTION

PATENT NO. : 8,836,193 B2  
APPLICATION NO. : 13/148805  
DATED : September 16, 2014  
INVENTOR(S) : Klaus Büttner et al.

Page 1 of 1

It is certified that error appears in the above-identified patent and that said Letters Patent is hereby corrected as shown below:

On the title page, item (74) should read: "Henry M. Feiereisen LLC"

Signed and Sealed this  
Sixth Day of January, 2015

Michelle K. Lee  
*Deputy Director of the United States Patent and Trademark Office*